United States Patent
Bhowmick et al.

(10) Patent No.: US 12,440,182 B2
(45) Date of Patent: Oct. 14, 2025

(54) GENERATION OF M-MODE DATA FOR DETECTING FETAL CARDIAC ACTIVITY

(71) Applicant: KONINKLIJKE PHILIPS N.V., Eindhoven (NL)

(72) Inventors: Soumabha Bhowmick, Bangalore (IN); Karthik Krishnan, Bangalore (IN); Karthik Raj Katipally, Bangalore (IN); Giridhar Narasapura Rajagopalaiah, Bangalore (IN); Celine Firtion, Surat (IN); Subhendu Seth, Bangalore (IN); Pallavi Vajinepalli, Bangalore (IN); David Nigel Roundhill, Woodinville, WA (US); Matthew Rielly, Seattle, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 117 days.

(21) Appl. No.: 18/572,466

(22) PCT Filed: Jun. 22, 2022

(86) PCT No.: PCT/EP2022/066933
§ 371 (c)(1),
(2) Date: Dec. 20, 2023

(87) PCT Pub. No.: WO2022/268844
PCT Pub. Date: Dec. 29, 2022

(65) Prior Publication Data
US 2025/0127479 A1    Apr. 24, 2025

Related U.S. Application Data

(60) Provisional application No. 63/214,353, filed on Jun. 24, 2021.

(30) Foreign Application Priority Data

Jul. 9, 2021  (EP) ..................... 21184713

(51) Int. Cl.
*A61B 8/02*    (2006.01)
*A61B 8/00*    (2006.01)
*A61B 8/08*    (2006.01)

(52) U.S. Cl.
CPC .............. *A61B 8/02* (2013.01); *A61B 8/0866* (2013.01); *A61B 8/486* (2013.01); *A61B 8/5207* (2013.01)

(58) Field of Classification Search
CPC ....... A61B 8/02; A61B 8/0866; A61B 8/0883; A61B 8/486; A61B 8/5207; G06T 7/0012
See application file for complete search history.

(56) References Cited

U.S. PATENT DOCUMENTS 5,515,856 A     5/1996  Olstad et al.
10,448,921 B2 * 10/2019 Strassner ............. A61B 8/5207
(Continued)

FOREIGN PATENT DOCUMENTS

CN    106377280 A    2/2017
CN    105496462 B    8/2018
(Continued)

OTHER PUBLICATIONS

International Search Report and Written Opinion for PCT/EP2022/066933; Mailing date: Sep. 28, 2022, 8 pages.
(Continued)

*Primary Examiner* — Carolyn A Pehlke (57) ABSTRACT

A mechanism for automatically generating and ranking M-mode lines for generating or defining M-mode data usable to assess fetal heart activity, e.g. determine a fetal heart rate. A region of interest, containing a fetal heart, in a sequence of ultrasound images is identified. The region of
(Continued)

interest is used to define the position of each of a plurality of M-mode lines, e.g. anatomical M-mode lines. A quality measure of each M-mode line is determined based on M-mode data generated for each M-mode line, and the quality measures are then used to rank the M-mode lines.

14 Claims, 4 Drawing Sheets

(56) References Cited

U.S. PATENT DOCUMENTS

| | | | |
|---|---|---|---|
| 2010/0185088 A1 | 7/2010 | Perrey et al. | |
| 2011/0021915 A1 | 1/2011 | Feng et al. | |
| 2014/0081144 A1 | 3/2014 | Moehring et al. | |
| 2016/0242732 A1 | 8/2016 | Strassner et al. | |
| 2017/0119343 A1 | 5/2017 | Pintoffl | |
| 2019/0142368 A1 | 5/2019 | Wohlschlager et al. | |
| 2020/0155114 A1* | 5/2020 | Park | A61B 8/463 |
| 2022/0167947 A1 | 6/2022 | Seth et al. | |
| 2023/0038364 A1 | 2/2023 | Bhowmick et al. | |

FOREIGN PATENT DOCUMENTS

| | | |
|---|---|---|
| CN | 109303573 A | 2/2019 |
| CN | 111374708 A | 7/2020 |
| EP | 3052023 B1 | 11/2019 |
| JP | H08173430 A | 7/1996 |
| WO | 2022096404 A1 | 5/2022 |

OTHER PUBLICATIONS

Maraci, M.A. et al., A framework for analysis of linear ultrasound videos to detect fetal presentation and heartbeat, Medical Image Analysis, 2017, vol. 37, pp. 22-36.

Deng, Y. et al., "Automated detection of fetal cardiac structure from first-trimester ultrasound sequences," 2010 3rd International Conference on Biomedical Engineering and Informatics, 2010, pp. 127-131.

Bridge, C. et al., "Automated annotation and quantitative description of ultrasound videos of the fetal heart", Medical Image Analysis, 2017, vol. 36, pp. 147-161.

Hornberger, L. et al., "Rhythm Abnormalities of the Fetus", Heart, 2007, vol. 93, pp. 1294-1300.

Emory University School of Medicine, "Fetal Heart Determination", retrieved from https://med.emory.edu/departments/emergency-medicine/sections/ultrasound/case-of-the-month/obgyn/fetal_determination.html, 2021.

Leiva, M.C. et al., "Fetal Cardiac Development and Hemodynamics in the First Trimester", Ultrasound Obstet Gynecol, 1999, vol. 14, No. 3, pp. 169-174.

Rodgers, S. et al., "Normal and Abnormal US Findings in Early First-Trimester Pregnancy: Review of the Society of Radiologists in Ultrasound 2012 Consensus Panel Recommendations", Radiographics, 2015, vol. 35, No. 7, pp. 2135-2148.

Binder, T. et al., "M-Mode ultrasound imaging", 123 Sonography, retrieved from https://123sonography.com/ebook/m-mode-ultrasound-imaging, 4 pages.

Danielsson, K. et al., "Risk of Miscarriage With Slow Fetal Heartbeat", retrieved from https://www.verywellfamily.com/slow-fetal-heart-rate-first-trimester-2371254, 2020, 4 pages.

Hareva, D. et al., "Determination of fetus heart rate based 2D ultrasound", 2016 International Conference on Information and Communication Technology Convergence (ICTC), 2016, pp. 48-51.

Hamelmann, P. et al., "Doppler Ultrasound Technology for Fetal Heart Rate Monitoring: A Review", IEEE Transactions on Ultrasonics, Ferroelectrics, and Frequency Control, 2020, vol. 67, No. 2, pp. 226-238.

Soerensen, K. et al., "Automatic Segmentation of Mitral Leaflet Movement in Doppler Tissue M-Mode Ultrasound", 2016 Computing in Cardiology Conference (CinC), 2016, pp. 1-4.

Nakata, M. et al., "Novel Technique to Detect Fetal Heart Rate Automatically Using Two-Dimensional Speckle-Tracking Echocardiography", Ultrasound in Obstetrics & Gynecology, 2014, vol. 44, p. 315.

* cited by examiner

GENERATION OF M-MODE DATA FOR DETECTING FETAL CARDIAC ACTIVITY

CROSS-REFERENCE TO PRIOR APPLICATIONS

This application is the U.S. National Phase application under 35 U.S.C. § 371 of International Application No. PCT/EP2022/066933, filed on Jun. 22, 2022, which claims the benefit of U.S. Provisional Patent Application No. 63/214,353, filed Jun. 24, 2021, and European Patent Application Ser. No. 21184713.2, filed on Jul. 9, 2021. These applications are hereby incorporated by reference herein.

FIELD OF THE INVENTION

The present invention relates to the field of ultrasound imaging, and in particular, to the generation of data usable to determine a fetal cardiac activity.

BACKGROUND OF THE INVENTION

Cardiac activity of a fetus or foetus (i.e. unborn offspring) is a sought-after vital sign that clinicians use in order to assess pregnancy viability. It is feasible to measure cardiac activity starting from week 6 of gestational age. It has observed that the normal fetal heart rate depends on the gestational age, so that abnormal or unexpected heart rates or other cardiac characteristics can be used to identify a risk of pregnancy failure.

For instance, it has been observed that the absence of or irregularities in any cardiac activity at the time when crown-rump length (of the fetus) is greater than 7 mm has high risk of pregnancy failure. Fetal bradycardia, e.g. a fetal heartbeat of less than 85 bpm, is also a strong indicator of potential risk to the fetus.

EP 3 052 023 B1 disclosed an ultrasonic diagnostic imaging system for identifying a fetal heart. It proposed to identify a region of interest responsive to a user control, to generate a plurality of spatially different M-mode lines associated with the region of interest, to analyze the echo data of the M-mode lines to identify the fetal heartbeat, and to rank the acquired echo data based on the measured fetal heart rates.

There is therefore an ongoing desire to provide accurate data usable for assessing fetal cardiac activity, such as fetal heart rate or irregularities caused by arrhythmia, such as ectopic beats or heart palpitations ("fluttering").

One approach for assessing fetal cardiac activity is to employ Doppler-based ultrasound techniques in order to measure blood flow to the heart. However, use of Doppler techniques can cause significant exposure of ultrasound to the embryo/fetus, which can increase a risk of pregnancy failure.

Alternative approaches to methods for detecting in utero cardiac activity would therefore be advantageous.

SUMMARY OF THE INVENTION

The invention is defined by the claims.

According to examples in accordance with an aspect of the invention, there is provided a processing system configured to generate M-mode data by processing a sequence of ultrasound images.

The processing system is configured to: obtain the sequence of ultrasound images, each ultrasound image containing a representation of a portion of a fetus, including the heart of the fetus; identify, in the sequence of images, a region of interest that contains a representation of the heart of the fetus in each ultrasound image; position a plurality of M-mode lines with respect to the sequence of ultrasound images, based on the identified region of interest; for each of the plurality of M-mode lines: generate M-mode data for the M-mode line; and determine a quality measure of the M-mode line by processing the generated M-mode data, and rank the plurality of M-mode lines based on the determined quality measure of each M-mode line. In particular, the step of identifying the region of interest comprises automatically detecting a first region of interest that contains a representation of the fetus in each ultrasound image and automatically identifying, inside the first region of interest, a second region of interest that contains the representation of the heart of the fetus. In some examples, the step of identifying the first region of interest comprises applying a first machine learning method to the ultrasound image, and the step of identifying the second region of interest comprises applying a second machine learning method to the first region of interest.

The present disclosure proposes an approach for automated positioning and assessment of M-mode lines on a sequence of ultrasound images. Different M-mode lines are positioned on a sequence of ultrasound images based on an identified location of a fetal heart in the ultrasound images. A quality measure is generated for each M-mode line (from M-mode data associated with the M-mode line), and used to rank the M-mode lines. This provides a set or collection of M-mode lines for automated or manual selection by a clinician. Automated ranking the M-mode lines provides the clinician with useful clinical information for selecting or distinguishing between different examples of M-mode data, e.g. to facilitate identification of which M-mode lines are likely to provide more clinically usefully data about the fetal heart.

This embodiment recognizes that different positions (e.g. orientations and/or alignments) for an M-mode line may result in M-mode data of differing accuracies. Thus, by generating M-mode data for each of a plurality of M-mode lines, M-mode data that accurately represents cardiac activity of the heart of the fetus can be generated.

Suitable examples of quality measures include the span of the M-mode line, the consistency/regularity of any periodic signals in the M-mode data, e.g. in terms of frequency and/or amplitude. In particular, the quality measure may be represent a measure of how accurately the M-mode data is able to provide information about the fetal heart, e.g. an accuracy of fetal heart rate derived from the M-mode data.

The region of interest may, for instance, be a region whose outer bounds are defined by the position and/or size of the heart of the fetus (the fetal heart) in the sequence of ultrasound images, and is smaller than the complete image. In particular examples, the outer bounds of the region of interest may represent the predicted outer bounds of the representation of the heart of the fetus in the ultrasound images. In particular, the region of interest may be a region that, for each ultrasound image, contains the representation of the fetal heart and is smaller than the total size of the ultrasound image.

The term "fetus" is here used to refer to unborn offspring of an animal (e.g. a mammal, reptile or bird). For the sake of the present disclosure, a fetus is considered to include any unborn offspring of an animal having a gestational age at which a beating heart is expected to be present, such that the term "fetus" may include embryos. For instance, if the fetus is a human fetus, the term "fetus" may refer to an embryo or fetus having a gestational age of at least 5 weeks.

The proposed approach facilitates quicker acquisition of suitable/accurate M-mode data for assessing the cardiac activity of the fetus. This effectively facilitates a reduced exposure of the fetus to ultrasound radiation, which has been identified as being a desirable characteristic of medical investigations of the fetus to reduce risk.

The step of positioning the plurality of M-mode lines may comprise positioning each M-mode line to pass through region of interest, e.g. pass through a center portion of the region of interest, e.g. a centroid of the region of interest.

In some examples, two or more M-mode lines are positioned (with respect to the sequence of ultrasound images) at different orientations with respect to the region of interest of the ultrasound image. In some examples, each M-mode line is positioned, with respect to the sequence of ultrasound images, at a different orientation with respect to the region of interest of the ultrasound image.

In this way, M-mode lines may effectively dissect or divide the (region of interest of) the ultrasound image at different angles. It is herein recognized that different angles for the M-mode line may result in the capture of different periodicity in accordance to the region through which the line is passing through, increasing a likelihood that an M-mode line will capture data usable for deriving fetal heart rate or other characteristics of the fetal heart.

Preferably, each different orientation is a predetermined orientation.

In some examples, each M-mode line is positioned, with respect to the sequence of ultrasound images, to pass through a different part of region of interest.

Preferably, each M-mode line is an anatomical M-mode line. Thus, an origin and/or and end point (start and end position) of the anatomical M-mode line can change for different M-mode lines. A start and/or end position of each anatomical M-mode line may be based upon the position of the region of interest. In particular examples, the start and/or end position of each anatomical M-mode line is located on a boundary of the region of interest.

The processing system may be further configured to control a user interface to display a visual representation of rankings of the plurality of M-mode lines.

The processing system may be further configured to: receive a user input comprising an indicator that identifies one of the M-mode lines; and control the user interface to display a visual representation of the M-mode data of the user-identified M-mode line and/or one or more characteristics of the heart of the fetus derived from the M-mode data of the user-identified M-mode line.

In some examples, the one or more characteristics of the heart of the fetus comprises a predicted fetal heart rate. A predicted heart rate of the fetus generates useful clinical information for assessing the condition of the fetus, e.g. determining a fetal viability. Methods of generating or predicted a heart rate of a fetus from suitable M-mode data of the fetus will be readily apparent to the skilled person, and may comprise identifying a frequency of a line representing motion of (part of) the fetal heart in the M-mode data.

Other suitable characteristics include a heart rate variability, a heart rate stability, an amplitude of heart movement, an average AV interval and so on.

In some examples, the processing system is further configured to control a user interface to display a visual representation of the M-mode data of the highest ranked M-mode line and/or one or more characteristics of the heart of the fetus derived from the M-mode data of the highest ranked M-mode line.

In this way, an automatic determination of the best possible M-mode data can be performed, e.g. the best single instance of M-mode data.

The processing system may be configured control each M-mode line to track any movement of the region of interest in the sequence of ultrasound images.

The processing system may be further configured to, for each M-mode data, compensate for motion artefacts based on a change in position of the bounding box between different ultrasound images in the sequence of ultrasound images.

There is also proposed a computer-implemented method of generating M-mode data from a sequence of ultrasound images. The computer-implemented method comprises: obtaining the sequence of ultrasound images, each ultrasound image containing a representation of a portion of a fetus, including the heart of the fetus; identifying, in the sequence of images, a region of interest that contains a representation of the heart of the fetus in each ultrasound image; positioning a plurality of M-mode lines on the sequence of ultrasound images, based on the identified region of interest; for each of the plurality of M-mode lines: generating M-mode data by processing the portion of each ultrasound image upon which the M-mode line was placed; and determining a quality measure of the M-mode line by processing the generated M-mode data, and ranking the plurality of M-mode lines based on the determined quality measure of each M-mode line.

There is also proposed a computer program product comprising computer program code means which, when executed on a computing device having a processing system, cause the processing system to perform all of the steps of any herein described method. There is also proposed a (non-transitory) computer-readable medium storing such a computer program product.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same 20 reference numerals are used throughout the Figures to indicate the same or similar parts.

The invention provides an approach for automatically generating and ranking M-mode lines for generating or defining M-mode data usable to assess fetal heart activity, e.g. determine a fetal heart rate. A region of interest, containing a fetal heart, in a sequence of ultrasound images is identified. The region of interest is used to define the position of each of a plurality of M-mode lines, e.g. anatomical M-mode lines. A quality measure of each M-mode line is determined based on M-mode data generated for each M-mode line, and the quality measures are then used to rank the M-mode lines.

Embodiments are based on the realization that generation of a plurality of M-mode lines, each based on a predicted position of a fetal heart, increases a chance that M-mode data (from which an accurate measure of fetal cardiac activity can be derived) will be generated. By performing an automated generation and ranking of the M-mode lines, a burden on the clinician is reduced, whilst providing vital information that a clinician can use to assess the accuracy and/or reliability of M-mode data (e.g. its ranks). In particular, multiple instances of M-mode data can be generated and used by a clinician to verify or confirm an assessment made on only a single one of the M-mode data, with the most appropriate M-mode data instances being readily identifiable based on their ranks.

Embodiments may be employed in any suitable ultrasound system, and in particular to ultrasound systems used to image a fetus during early stages of fetal development.

Figure 1:
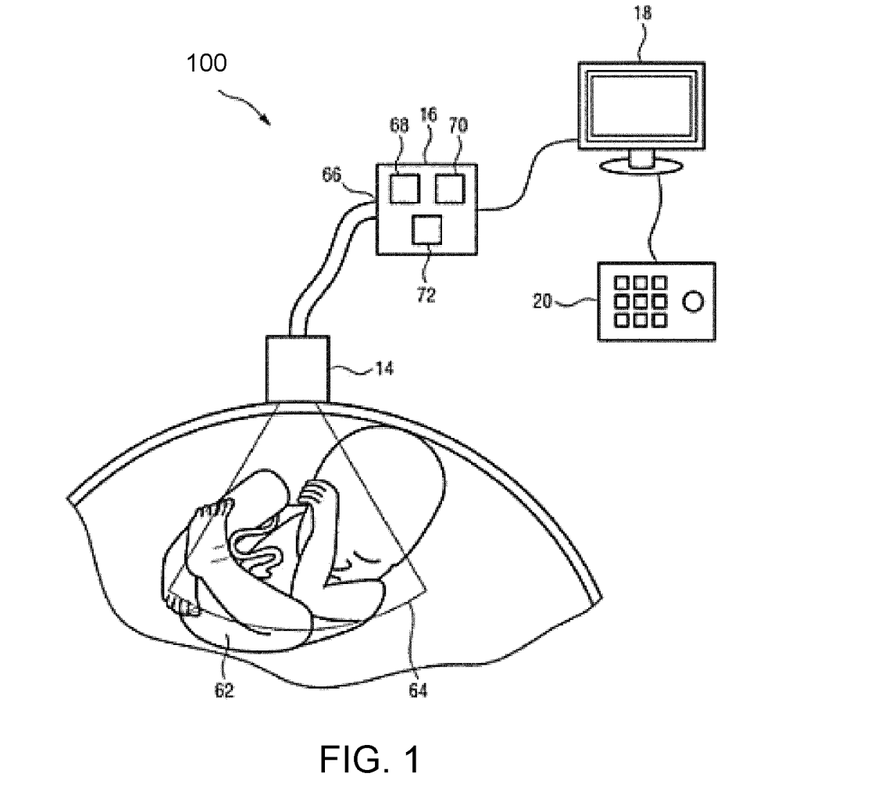
FIG. 1 illustrates an ultrasound system.

FIG. 1 shows a schematic illustration of an ultrasound system 100, in particular a medical two-dimensional (2D) ultrasound system or three-dimensional (3D) ultrasound system. The ultrasound system is itself an embodiment of the invention or comprises an embodiment of the invention.

The ultrasound system 100 may be applied to inspect a volume of an anatomical site. For example, the ultrasound system 100 scans a fetus 62 using an ultrasound probe 14. The ultrasound probe 14 generates ultrasound images of an anatomical site, which is generally denoted by 64. The ultrasound probe 14 may have at least one transducer array having a multitude of transducer elements for transmitting and/or receiving ultrasound waves. In one example, each of the transducer elements can transmit ultrasound waves in form of at least one transmit impulse of a specific pulse duration, in particular a plurality of subsequent transmit pulses. The transducer elements may be arranged in a linear array in case of a 2D ultrasound system 100 or may be arranged in a two-dimensional array, in particular for providing a multi-planar or three-dimensional image in case of a 2D ultrasound system 100. In general, (matrix) transducer systems as found on Philips iE33 systems or mechanical 3D/4D transducer technology as found, for example, on the Philips EPIQ and Affiniti systems, e.g. including a mechanical V6-2 probe, may be applied in conjunction with the current invention.

The ultrasound probe may be further configured to generate a sequence of ultrasound images based on the ultrasound data generated during imaging of the anatomical site.

The ultrasound probe 14 may be connected to a (ultrasound image) processing system 16 via an ultrasound data interface 66, which may be wired or wireless interface. The processing system 16 is itself an embodiment of the invention.

The processing system 16 may comprise a segmentation unit 68, an M-mode line placement unit 70 and a quality assessment unit 72. It should be understood that such units may be implemented in any suitable manner, e.g. by one or more suitably configured processors, which will also be referred to in the present application as a processor arrangement, i.e. an arrangement of one or more processors adapted to implement the functionality of the segmentation unit 68, an M-mode line placement unit 70 and a quality assessment unit 72 as described in more detail below.

The processing system 16 may be connected to a user interface, e.g. for displaying the results of the ultrasound scan, and which is connected to an input interface 10 for inputting instructions to control the ultrasound system 100. The user interface 18 may be separate to the processing system 16 or may form part of the processing system 16, e.g. may be integrated into the processing system 16. The input interface 10 may comprise keys or a keyboard and further inputting devices, for example a trackball or a mouse. The input interface 10 may be connected to the user interface 18 or directly to the processing system 16.

In this example embodiment, the processing system 16 may receive a (temporal) sequence of ultrasound images, e.g. 2-D images or 3-D images directly from the ultrasound probe 14. However, it should be understood that it is equally feasible for the processing system 16 to retrieve the (temporal) sequence of ultrasound images from a data storage arrangement (not shown) such as a local or remote data storage device into which the temporal sequence of ultrasound images was temporarily stored to facilitate 'off-line' evaluation of the scan results, e.g. after completion of the investigation of the female patient carrying the fetus 62. The data storage arrangement for example may include one or more memory devices, hard disks, optical discs, or the like, in which the processing system 16 may store image frames and image frame processing data, e.g. for evaluation at a later date.

The segmentation unit 68 is provided for identifying or segmenting anatomical features of the fetus 62 in the sequence of (2D or 3D) ultrasound images, e.g. captured by the ultrasound probe 14, in particular a region of interest containing a heart of the fetus. The segmentation unit 68 may thereby provide segmentation data of anatomical structures (including at least the identified region of interest) of the fetus 62.

The M-mode line placement unit 70 is configured to place a plurality of M-mode lines on the sequence of ultrasound images based on the identified region of interest, i.e. based on the segmentation data.

The quality assessment unit 72 is configured to determine a quality measure for each M-mode line based on M-mode data derived from each M-mode line. The quality assessment unit also ranks each M-mode line based on the determined quality measure.

A more complete description of steps performed by the units of the processing system will be provided later in the description.

It should be noted that the illustrated fetus 62 is purely for the purposes of understanding, and that the size and/or development of the fetus may, in practice, differ from the illustrated size and/or development of the fetus. It should also be noted that the illustrated ultrasound probe is a surface probe that makes contact with a subject's skin, whereas alternative probe configurations (e.g. transvaginal probes) could be used.

Figure 2:
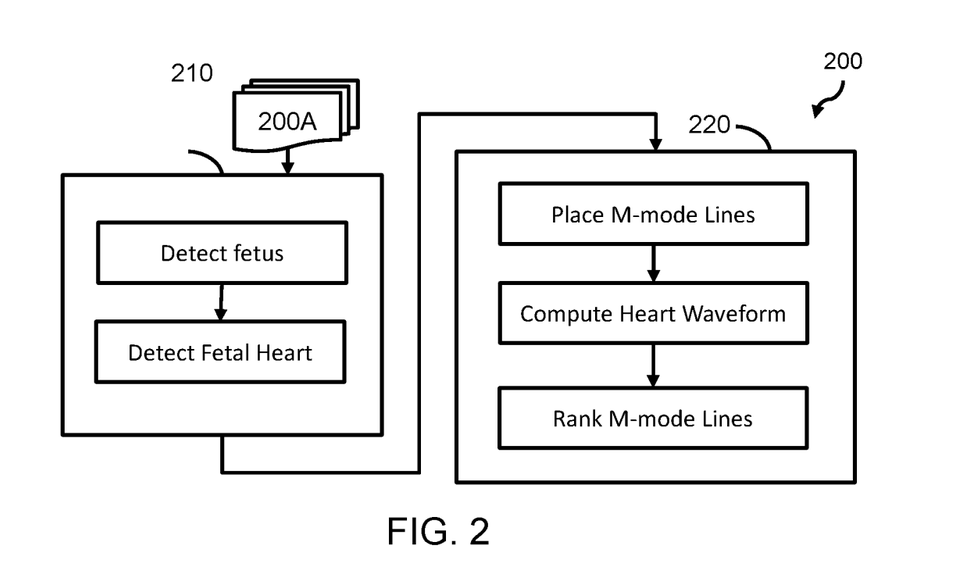
FIG. 2 schematically illustrates an approach according to an embodiment.

FIG. 2 is a diagram schematically illustrating an approach proposed by the present disclosure. In particular, FIG. 2 illustrates a workflow 200 performed in carrying out embodiments of the invention.

The workflow is conceptually divisible into two parts: a first part 210 that includes processing of a sequence of ultrasound images to identify a region of interest containing a fetal heart; and a second part 220 that includes placement and analysis of M-mode lines on the sequence of ultrasound images based on the region of interest.

The workflow thereby receives, as input, a sequence of ultrasound images 200A of a fetus and provides, as output, M-mode data and/or assessment results of M-mode lines placed on the sequence of ultrasound images (in particular, a ranking of different possible M-mode lines for the sequence of ultrasound images). The assessment is performed with respect to the fetal heart, e.g. to assess the usefulness or quality of data for deriving one or more fetal heart characteristics.

In the context of the present disclosure, a sequence of ultrasound images is considered to be a sequence of temporal frames, i.e. a temporal sequence of ultrasound images captured one after the other. This can effectively form a video (of frames) or a cineloop.

The sequence of ultrasound images may, for instance, be transvaginal (TV) ultrasound images. Transvaginal ultrasound offers higher resolution images during early pregnancy, such that a TV probe is preferred for pregnancy scans before 8 weeks of gestation due to its better visualization. However, because the fetal heart may occupy a very small area on the image, in order to detect and localize heart, probe may be insonated so as to capture the beating heart. Insonation of the probe to localize a beating heart is relatively difficult with a TV probe given the constraints of the anatomical geometry one has to work with.

The first part 210 of the workflow processes the sequence of ultrasound images to identify a region of interest, the region of interest being a portion or part that (for each ultrasound image) contains the fetal heart. In particular, the position of the region of interest may be identified in each ultrasound image. This may be performed by detecting, in each ultrasound image, a first region of interest containing the fetus and optionally then identifying a second (smaller) region of interest containing the fetal heart inside the first region of interest. The second region of interest may act as the "region of interest" for the purposes of the following disclosure. As compared to a manual detection of the beating heart or a direct automatic detection of the beating heart, such two-stage approach can achieve higher accuracy, especially in the early obstetrics cases where the gestational age is less than 11 weeks and the heart is very small. In some embodiments, the first part 210 of the workflow processes may further comprise the step of setting the second region of interest as the first region of interest if it fails to identify the beating heart.

The first region of interest may contain the entire detected fetus. Alternatively, the first region of interest may contain a large portion of the entire detected fetus, e.g. at least fifty percentage of the entire detected fetus. By way of example only, the first region of interest may contain the entire torso of the fetus. The automatic detection of the fetus can be implemented by various ways such as a machine learning method (e.g. an artificial intelligence network). After firstly detecting the fetus, the beating heart having a periodic appearance over the sequence of temporal frames is then identified. Any automatic approach suitable for detecting an object having a periodic appearance can be adopted. For example, the second region of interest can be identified by analyzing one or more features representing the motion over the time. For another example, the second region of interest can be identified by means of machine learning method too.

By way of example only, the first part 210 may comprise steps of: applying a first neural network to the ultrasound image, wherein the first neural network is trained to detect a fetus, thereby generating as output the coordinates of at least one first bounding box; cropping the ultrasound image to the first bounding box, thereby generating a cropped image containing the image content within the first bounding box; and applying a second neural network to the cropped medical image, wherein the second neural network is trained to detect a fetal heart, thereby generating as output the coordinates of at least one second bounding box.

The first neural network and/or the second neural network may be a fully convolutional neural network. Purely by way of example, the first neural network and/or the second neural network may be a YOLO fully convolutional neural network.

This approach advantageously crops the input medical image to a bounding box containing the larger-sized anatomical structure, and uses the cropped image for searching the smaller-sized anatomical structure. In this manner, the neural network that is used at each hierarchical level to detect an anatomical structure (e.g. at the larger-sized and smaller-sized hierarchical level) requires a much simpler architecture, can be trained faster and is more robust, i.e. has a higher average precision. In other words, an independent and separate neural network may be implemented at each hierarchical level and may be thus specifically trained for the specific detection task in accordance with the hierarchical level.

Thus, the position of the beating heart across the sequence of images can be detected.

Any suitable segmentation technique may be used to identify a region of interest, e.g. a Hankel transformation algorithm, a deformable contour segmentation algorithm and/or a machine-learning method. As such algorithms are well-known per se, the segmentation technique will not be explained in further detail for the sake of brevity only.

The second part 220 of the workflow then positions a plurality of M-mode lines with respect to the sequence of ultrasound images. A quality measure of each M-mode line is then derived from M-mode data generated for each M-mode line, e.g. by assessment of heart waveforms computed from the M-mode data of each M-mode line (as illustrated). The M-mode lines are then ranked based on the determined quality measure.

A ranked set of M-mode lines provides an indication of an automatic best possible line, for use in post processing stage. It would also be used to provide clinicians with an ensemble of possible lines, which could be investigated in order to have a better diagnosis (e.g. if a most highly ranked M-mode line is erroneous or misleading to a clinician's view). Multiple M-mode lines can be used to reinforce a decision made by a clinician, and ranking a set of automatically positioned M-mode lines would ease a clinician's task of identifying appropriate M-mode data.

Use of multiple M-mode lines is advantageous as, during early development of the fetus, the fetal heart occupies a relatively small space in the sequence of ultrasound images, meaning that placement of an M-mode line must be precise in order to accurately capture movement of the fetal heart, i.e. the accuracy of fetal heart measurements is extremely sensitive to correct placement of the M-mode line. Using multiple M-mode lines allows a "scattergun" approach to be adopted to increase the likelihood that appropriate M-mode data for deriving accurate characteristics of the fetal heart is obtained.

Now that a general description of the approach adopted by the present disclosure has been provided, a more complete discussion of embodiments is hereafter provided.

Figure 3:
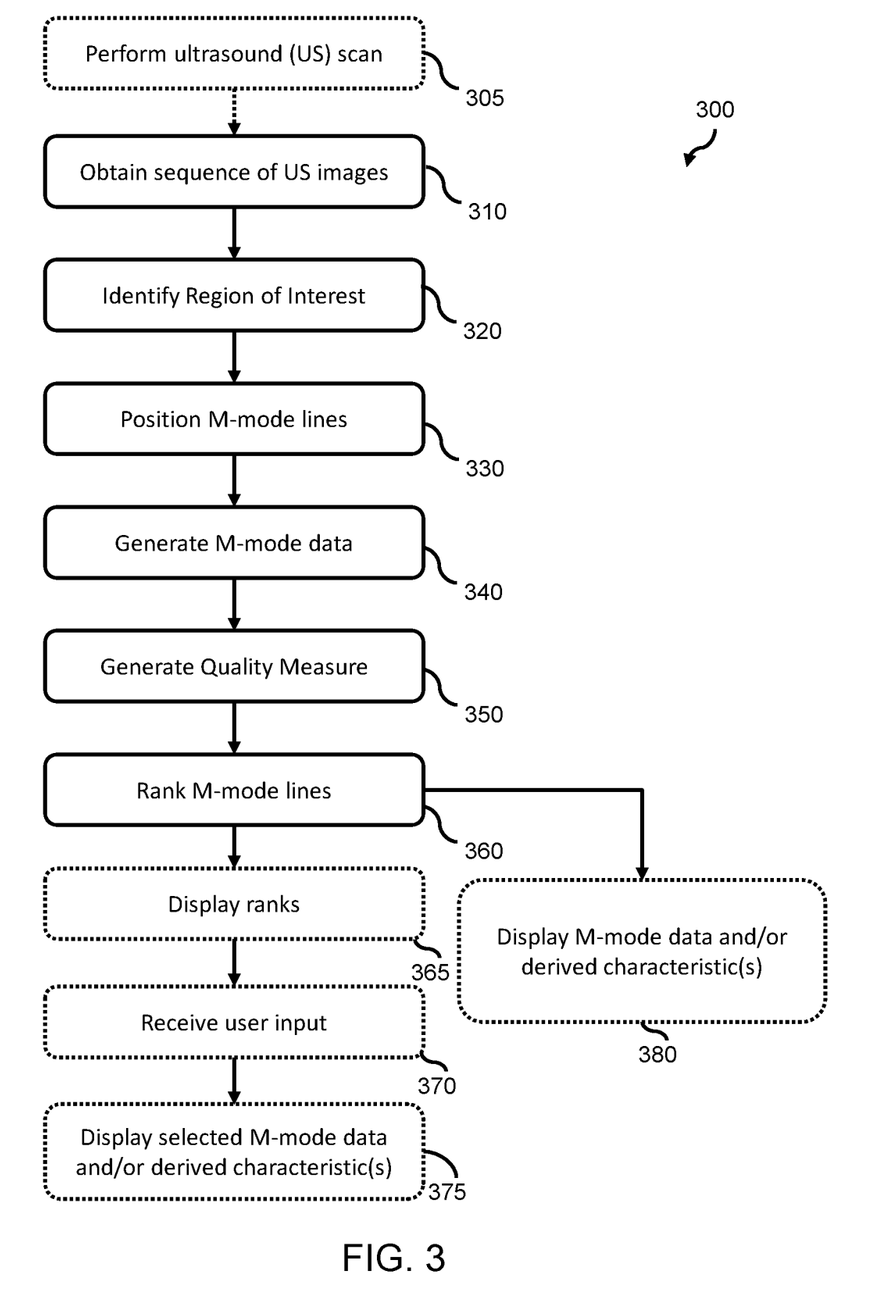
FIG. 3 is a flowchart illustrating a method according to an embodiment.

FIG. 3 is a flowchart illustrating a (computer-implemented) method 300 according to an embodiment. The method 300 may be carried out by a processing system configured to perform all the steps of method 300, e.g. the processing system 16 of FIG. 1.

The method 300 comprises a step 310 of obtaining the (temporal) sequence of ultrasound images, each ultrasound image containing a representation of a portion of a fetus, including the heart of the fetus. The sequence of ultrasound images may be obtained directly from ultrasound imaging apparatus or from a memory/store containing the sequence of ultrasound images. Step 310 may, for instance, be performed by an input interface of the processing system.

The method 300 also comprises a step 320 of identifying, in the sequence of images, a region of interest that contains a representation of the heart of the fetus in each ultrasound image. Step 320 may be performed, for example, by processing the sequence of images using a segmentation algorithm, such as those previously described. The region of interest may be defined by a bounding box that is located/positioned on (i.e. overlays) the sequence of ultrasound images. Step 320 may, for example, be performed by a segmentation unit of the processing system.

In some examples, step 320 comprises determining any movement of the region of interest. This may reflect a movement of the fetus within the sequence of ultrasound images, e.g. due to ultrasound probe motion, movement of the parent and/or movement of the fetus within the parent. The position of the region of interest (or bounding box) in each ultrasound image in the sequence can be determined. Put another way, the position and/or size of the region of interest (i.e. bounding box) may change across the sequence of images. The determination of the position of the region of interest in the temporal sequence can comprise determining the position of the first region of interest or the second region of interest in the temporal sequence. In some embodiments, it may track the movement of both the first region of interest and the second region of interest and determining the movement of the fetus within the sequence of the ultrasound images based on both the movement of the first region of interest and the movement of the second region of interest.

The method 300 also comprises a step 330 of positioning a plurality of M-mode lines with respect to the sequence of ultrasound images, based on the identified region of interest. Step 330 may, for example, be performed by an M-mode line placement unit of the processing unit.

The plurality of M-mode lines may be positioned so that at least two of the M-mode lines overlap a different portion or part of the region of interest.

This could be achieved, for instance, by positioning each of two or more M-mode lines to lie at a different orientation with respect to the region of interest. Each M-mode line will capture a different periodicity in accordance to the region the line is passing through. In some examples, each M-mode line is positioned to pass through the center portion of the region of interest, i.e. the center portion of the bounding box defining the region of interest.

In one example, the region of interest could be conceptually divided into a plurality of sub-regions (e.g. forming a grid within the region of interest). For the avoidance of doubt, it is noted that the size of sub-region is smaller than a size of the region of interest (i.e. is a part of the region of interest). For instance, if a region of interest is a rectangular box, the sub-regions may form a rectangular grid of (smaller) boxes. Each M-mode line may be configured to pass through a particular sub-region in the region of interest. In particular, at least two M-mode lines may be positioned to pass through different sub-regions of the region of interest. For instance, each M-mode line may be configured to pass through a center (most) portion (e.g. a centroid) of the sub-region through which it passes, e.g. through a centroid of the sub-region. Thus, a conventional M-mode line (which has a fixed point of origin) may start at the fixed point of origin and have an end point that results in the M-mode line passing through the (e.g. center (most) portion or centroid) of a region of interest.

The minimum size of a sub-region is a single pixel/voxel. The maximum size for a sub-region is equal to the size of the region of interest minus one pixel. The sub-regions may be equally sized for improved consistency, although this is not essential.

In some examples, where the position of the bounding box changes over the sequence of ultrasound image (e.g. due to movement of the ultrasound probe or the fetus), each M-mode line may be configured to move with the movement of the bounding box. Thus, the position of each M-mode line may change for different images of the sequence of ultrasound images (e.g. if the position of the bounding box changes). This can be performed, for instance, by controlling each M-mode line to have a fixed orientation with respect to the bounding and/or to pass through a same region/location within the bounding box.

In other words, step 320 may comprise controlling each M-mode line to track any movement of the region of interest in the sequence of ultrasound images.

In this way, the position of the M mode line would reflect only movement of the fetus, and not the movement due to the heart beating. Similarly, any M-mode image derived using the M-mode line (as later described) would reflect only the movement due to the heart beating, but not interfered by the position change of the fetus itself.

Step 320 may therefore effectively comprise, for each M-mode line determine a placement of the M-mode line on each ultrasound image responsive to the region of interest of the respective ultrasound image.

Figure 4:
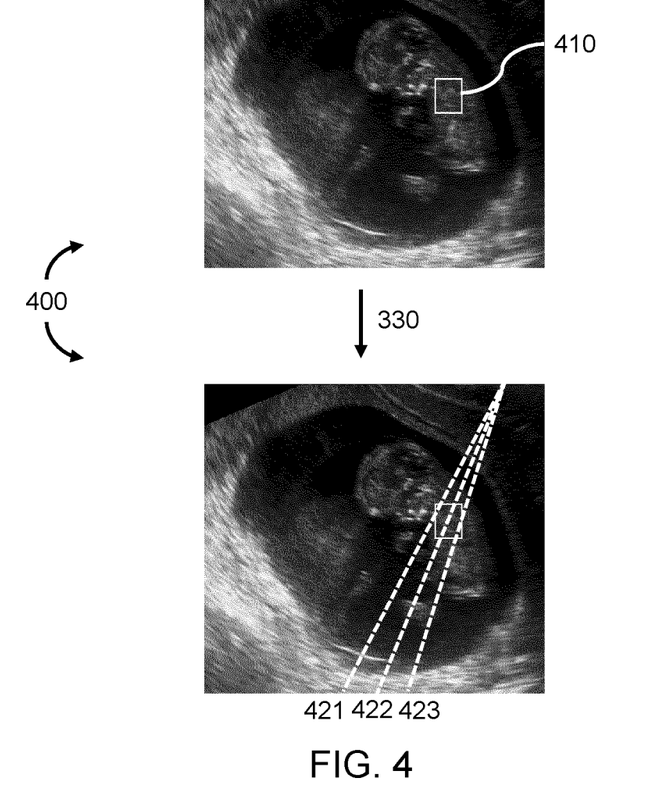
FIG. 4 illustrates a process for positioning M-mode lines.

FIG. 4 conceptually illustrates an embodiment of step 330.

FIG. 4 illustrates an ultrasound image 400 for which a region of interest 410 contains a fetal heart. A plurality of M-mode lines 421, 422, 423 are positioned to intersect the region of interest.

Turning back to FIG. 3, the method 300 also comprises a step 340 of, for each M-mode line, generating M-mode data. Approaches for generating M-mode data for a placed M-mode line are well known in the art, and are not discussed here for the sake of brevity only.

M-mode data may, for instance, comprise temporal echo data for an M-mode line or an M-mode image in which one axis represents a position along a line and another axis represents time (with an intensity of each pixel of the image representing an intensity of an echo response).

Generally, M-mode data may comprise time motion data of the sequence of ultrasound images along a chosen ultrasound line. It provides a mono-dimensional view of the subject along a time axis. One advantage of M-mode data is that it can have a very high sampling rate, which results in a high time resolution so that even very rapid motions can be recorded, displayed, and measured.

In some examples, the M-mode data may be generated by using the portion of each ultrasound image underneath the M-mode line positioned on the sequence of ultrasound image. Thus, step 330 may comprise, for each M-mode line, generating M-mode data by processing the portion of each ultrasound image upon which the said M-mode line was placed.

The method 300 further comprises a step 350 of determining, for each M-mode line, a quality measure of the M-mode line by processing the M-mode data.

Various forms of quality measure are envisaged within the scope of this disclosure, such as statistical parameters. A quality measure may be a numeric, binary or categorical measure, e.g. of how closely characteristics of the M-mode data (for a particular M-mode line) meets predefined or desired characteristics. It should be understood that a quality measure represents a quality of the M-mode data and/or characteristics derivable therefrom, i.e. providing an indication of how accurate or "true to life" the M-mode data or characteristics derivable therefrom are.

A quality measure may, for instance, represent a quality of a waveform, representing a fetal heart rate, derivable from the M-mode data. Thus, a quality measure may represent a quality of the acquisition or accuracy of a fetal heart characteristic (e.g. fetal heart rate) derivable from the M-mode data.

In one example, the M-mode data may be processed to identify a periodic signal or pulsate motion in the M-mode data. This motion can be assumed to represent a fetal heart rate (as this will be the largest contributor to a periodic signal in M-mode data derived from an M-mode line passing through the region of interest. In particular, the motion may represent a movement of part of the fetal heart whose movement represents the fetal heart rate.

By tracking the changing position of a particular part of the fetal heart using the M-mode data, a waveform in phase with the heart cycle can be produced ("heart waveform"). This heart waveform can be processed to generate a quality measure for the M-mode line associated with the M-mode data.

As one example, a quality measure may be derived from or equal to a standard deviation and/or mean of the distance (i.e. in time) between two consecutive peaks of the heart waveform. This would provide a measure of consistency of the generated heart waveform, directly representing the quality of the derived fetal heart rate.

As another example, another quality measure may be derived from or equal to a standard deviation and/or mean of the amplitude of the heart waveform, where an amplitude is a difference between a maxima and immediately adjacent minima of the heart waveform. A changing amplitude may indicate that the M-mode line is not accurately positioned (e.g. does not cover a same region of the fetal heart throughout the sequence of images).

These two examples of quality measures may be combined to produce a quality measure according to another embodiment, e.g. using a weighted sum, weighted multiplication or the like.

It is hypothesized that lower variations (in peak-to-peak distance or amplitude) or means a stable signal, thereby higher confidence and quality.

Yet another example of a quality measure may be a measure of noise (e.g. a measure of white noise) present in the M-mode data. Approaches for assessing a level or measure of noise in data are well established in the prior art.

The method 300 then performs a step 360 of ranking the plurality of M-mode lines based on the determined quality measure of each M-mode line.

Steps 340, 350 and 360 may be performed by a quality assessment unit of the processing system.

The method 300 may comprise a step 305 of performing an ultrasound scan to generate the sequence of ultrasound images. This step is not essential and could be omitted, e.g. if the sequence of ultrasound images are already present in a memory or storage unit.

The method 300 may further comprise a step 365 of displaying the rank of each of the plurality of M-mode lines. This may comprise controlling a user interface to provide a visual representation of the rank of each of the plurality of M-mode lines.

In some examples, the method 300 may further comprise a step 370 of receiving a user selection of one or more of the M-mode lines, e.g. via a user input provided at an input interface. In response to receiving a user selection, the method may display, in a step 375, the M-mode data generated for the selected M-mode line(s) and/or fetal heart characteristics (such as a fetal heart rate) derived from the M-mode data. This may comprise controlling a user interface to provide a visual representation of the M-mode data and/or derived characteristics.

Example fetal heart characteristics include a fetal heart rate, a heart rate variability, a heart rate stability, an amplitude of heart movement, an average PQ interval and so on. If required for display, step 380 may comprise generating the fetal heart characteristics by processing the M-mode data of the selected M-mode line.

In some examples, the method 300 may comprise a step 380 of displaying the M-mode data, and/or one or more fetal heart characteristics derived therefrom, generated for the M-mode line having the highest rank. This may comprise controlling a user interface to provide a visual representation of the M-mode data and/or one or more fetal heart characteristics derived therefrom.

Example fetal heart characteristics include a fetal heart rate, a heart rate variability, a heart rate stability, an amplitude of heart movement, an average PQ interval and so on. If required for display, step 380 may comprise generating the fetal heart characteristics by processing the M-mode data of the M-mode line.

If a user selection of another M-mode line is made (e.g. in step 370), then the display of the M-mode data, and/or one or more fetal heart characteristics derived therefrom, of the highest ranked M-mode line may be stopped.

In some examples, the M-mode lines are anatomical M-mode (AAM) lines. An anatomical m-mode line differs from a conventional or normal m-mode line in that both the start and end positions of an anatomical m-mode line can be freely chosen. In a normal or conventional m-mode line, the start position, i.e. its origin, is fixed (e.g. as illustrated in FIG. 4). The proposed approach facilitates automatic placement of an anatomical m-mode line (or lines) on a sequence of ultrasound images.

The identification of the region of interest could thus be used to improve temporal resolution for anatomical M-mode lines by restricting or defining the position of the anatomical M-mode lines based on the region of interest.

In particular examples, the anatomical m-mode lines may be positioned to be bounded by the region of interest, reducing the effective computation area for generation of anatomical m-mode data, resulting in better temporal resolution of the anatomical m-mode data. In yet other examples, the start and/or end position of each anatomical m-mode line may be within a predetermined distance of the region of interest. In yet other examples, the anatomical m-mode lines may be positioned so as to pass through the region of interest (e.g. without necessarily being bounded by the region of interest).

In some examples, each of the plurality of anatomical m-mode lines are positioned to pass through a center portion of the region of interest, but at different orientations with respect to the region of interest.

In some examples, each of the plurality of anatomical m-mode lines is positioned to pass through a (e.g. center portion or centroid of) a sub-region of the region of interest. It has previously been explained how a region of interest may be conceptually sub-divided into a plurality of sub-regions. AAM lines may be positioned with respect to a particular sub-region.

In particular examples, there may be one or more sets of one or more AAM lines, each set of AAM lines being configured to pass through (e.g. a center (most) portion of) a different sub-region of the region of interest. For instance, there may be two or more sets of one or more AAM lines, e.g. a set of AAM lines for each sub-region of the region of interest. In some examples, at least one set of AAM lines (e.g. at least two sets or each set) comprises at least two AAM lines.

In some examples, at least one set of AAM lines comprises a plurality of AAM lines. In this case, each AAM line in the set may be positioned at a different predetermined orientation with respect to the corresponding sub-region. The orientations of the AAM line may be evenly distributed with respect to one another, e.g. so that an angular difference between an AAM line and a most proximate AAM line is fixed. Thus, an angular resolution of the set(s) of AAM lines may be fixed.

The angular resolution, number of AAM lines, number of sets of AAM lines, number of AAM lines in each set of AAM lines may be predetermined and/or responsive to a user input.

It will be appreciated that AAM lines may come in AAM line pairs. Thus, in some examples, the step of ranking the M-mode lines may comprise ranking the AAM line pairs.

Figure 5:
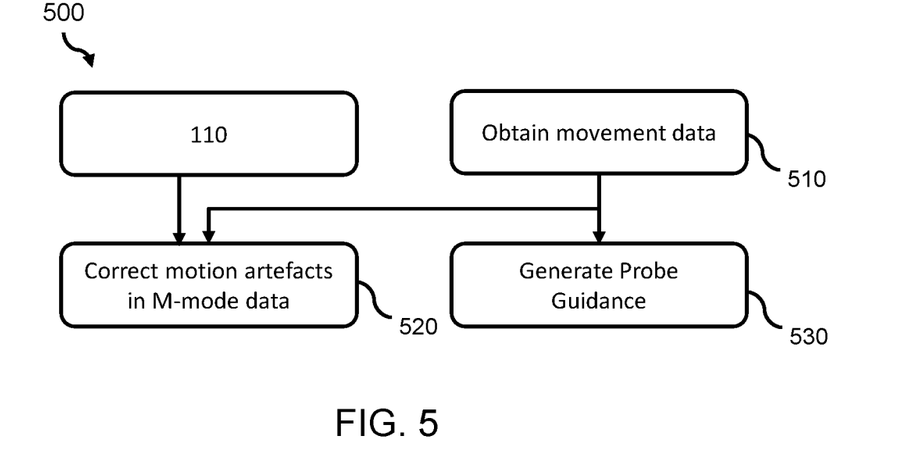
FIG. 5 is a flowchart illustrating a method according to an embodiment.

FIG. 5 is a flowchart illustrating a (computer-implemented) method 500 according to an embodiment. The method 500 may be carried out by a processing system configured to perform all the steps of method 500, e.g. the processing system 16 of FIG. 1. The method 500 illustrates a number of approaches to overcoming or avoiding motion artefacts in the ultrasound images and/or M-mode data.

The method 500 comprises performing the method 300 described with reference to FIG. 3.

The method 500 also comprises a step 510 of obtaining movement data, responsive to a movement of the position of the fetus within the sequence of ultrasound images.

The movement data may comprise, for instance, sensor data obtained from an ultrasound probe (or a sensor attached thereto) responsive to movement of the probe (and therefore movement of the fetus within the sequence of ultrasound images).

In some examples, the movement data may comprise a tracked movement of the position of the region of interest between different ultrasound images in the sequence of ultrasound images (e.g. coordinates of a bounding box defining the position of a ROI in each ultrasound image).

The movement data may be used, in a step 520 to correct motion artefacts in the M-mode data (e.g. of each M-mode data generated or, to save processing power, only in the M-mode data of the selected and/or highest ranked M-mode line).

In some examples, guidance is generated (and preferably displayed) for a clinician based on the movement data, e.g. to guide a user to reposition the ultrasound probe back to an original position.

Motion variation has a particularly large impact on the detection of fetal heart rate, especially during early development of the fetus, as the size of the fetal heart (in an ultrasound image) is so small that any motion significantly impact an ease and efficiency of identifying the location of the fetal heart.

Embodiments have described how M-mode data can be generated for each of a plurality of M-mode lines. There is also herein proposed an approach for generating M-mode data for one or more M-mode lines to be positioned upon a sequence of ultrasound images. The approach comprises steps of obtaining a sequence of ultrasound images, each ultrasound image containing a representation of a portion of a fetus, including the heart of the fetus; identifying, for each ultrasound image, a region of interest containing a representation of the heart of the fetus; for each of one or more M-mode lines: determining a placement of the M-mode line on each ultrasound image responsive to the region of interest of the respective ultrasound image; and generating M-mode data by processing the portion of each ultrasound image upon which the said M-mode line was placed.

Thus, as the position of an M-mode line for any given ultrasound image is dependent upon the location of the region of interest of the said ultrasound image, the position of the M-mode line would effectively track the region of interest if it moves between different ultrasound images. This provides M-mode data that at least partially compensates for motion of the representation of the fetus within the sequence of the ultrasound images (e.g. caused by movement of the fetus, of the bearer or of the ultrasound device that captured the ultrasound images).

The proposed approach facilitates quicker acquisition of suitable/accurate M-mode data for assessing the cardiac activity of the fetus. This effectively facilitates a reduced exposure of the fetus to ultrasound radiation, which has been identified as being a desirable characteristic of medical investigations of the fetus to reduce risk.

In this proposed approach, the position of an M-mode line on an ultrasound image is largely independent of the position of the same M-mode line on another ultrasound image (i.e. the position is calculated separately for each ultrasound image).

This approach can be embodied as a method, a computer program, (non-transitory) computer readable medium and/or a processing system.

Figure 6:
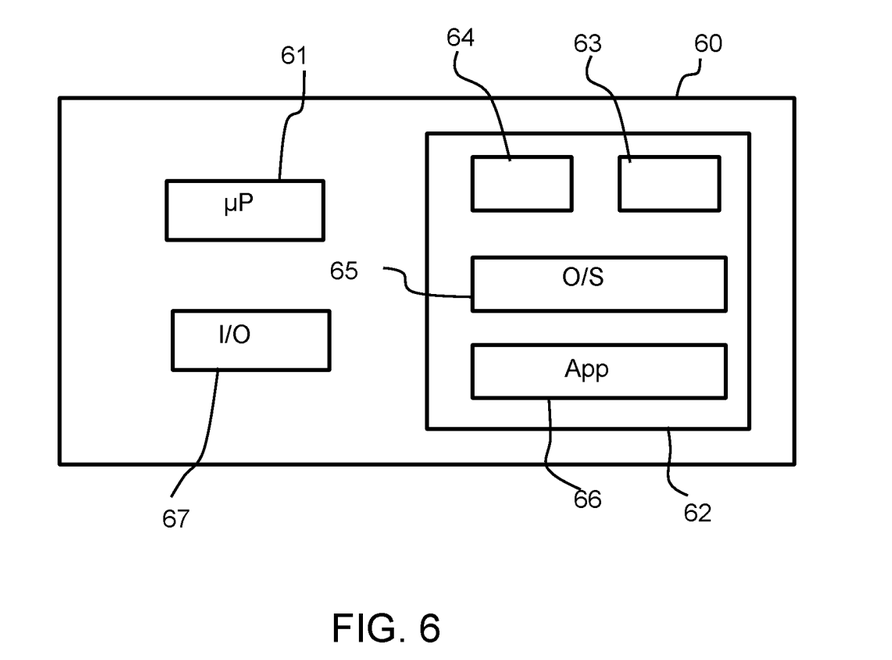
FIG. 6 illustrates a processing system according to an embodiment.

By way of further example, FIG. 6 illustrates an example of a processing system 60 within which one or more parts of an embodiment may be employed. The processing system 60 provides one working example of the processing system 16 described with reference to FIG. 1.

Various operations discussed above may utilize the capabilities of the processing system 60. For example, one or more parts of a system for generating M-mode data or ranking M-mode lines may be incorporated in any element, module, application, and/or component discussed herein. In this regard, it is to be understood that system functional blocks can run on a single computer or may be distributed over several computers and locations (e.g. connected via internet).

The processing system 60 includes, but is not limited to, PCs, workstations, laptops, PDAs, palm devices, servers, storages, and the like. Generally, in terms of hardware architecture, the processing system 60 may include one or more processors 61, memory 62, and one or more I/O devices 67 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 61 is a hardware device for executing software that can be stored in the memory 62. The processor 61 can be virtually any custom made or commercially available processor, a central processing unit (CPU), a digital signal processor (DSP), or an auxiliary processor among several processors associated with the processing system 60, and the processor 61 may be a semiconductor based microprocessor (in the form of a microchip) or a microprocessor.

The memory 62 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 62 may incorporate electronic, magnetic, optical, and/or other types of storage media. Note that the memory 62 can have a distributed architecture, where various components are situated remote from one another, but can be accessed by the processor 61.

The software in the memory 62 may include one or more separate programs, each of which comprises an ordered listing of executable instructions for implementing logical functions. The software in the memory 62 includes a suitable operating system (O/S) 65, compiler 64, source code 63, and one or more applications 66 in accordance with exemplary embodiments. As illustrated, the application 66 comprises numerous functional components for implementing the features and operations of the exemplary embodiments. The application 66 of the processing system 60 may represent various applications, computational units, logic, functional units, processes, operations, virtual entities, and/or modules in accordance with exemplary embodiments, but the application 66 is not meant to be a limitation.

The operating system 65 controls the execution of other computer programs, and provides scheduling, input-output control, file and data management, memory management, and communication control and related services. It is contemplated by the inventors that the application 66 for implementing exemplary embodiments may be applicable on all commercially available operating systems.

Application 66 may be a source program, executable program (object code), script, or any other entity comprising a set of instructions to be performed. When a source program, then the program is usually translated via a compiler (such as the compiler 64), assembler, interpreter, or the like, which may or may not be included within the memory 62, so as to operate properly in connection with the O/S 65. Furthermore, the application 66 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, .NET, and the like.

The I/O devices 67 may include input devices such as, for example but not limited to, a mouse, keyboard, scanner, microphone, camera, etc. Furthermore, the I/O devices 67 may also include output devices, for example but not limited to a printer, display, etc. Finally, the I/O devices 67 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 67 also include components for communicating over various networks, such as the Internet or intranet.

If the processing system 60 is a PC, workstation, intelligent device or the like, the software in the memory 62 may further include a basic input output system (BIOS) (omitted for simplicity). The BIOS is a set of essential software routines that initialize and test hardware at startup, start the O/S 65, and support the transfer of data among the hardware devices. The BIOS is stored in some type of read-only-memory, such as ROM, PROM, EPROM, EEPROM or the like, so that the BIOS can be executed when the processing system 60 is activated.

When the processing system 60 is in operation, the processor 61 is configured to execute software stored within the memory 62, to communicate data to and from the memory 62, and to generally control operations of the processing system 60 pursuant to the software. The application 66 and the O/S 65 are read, in whole or in part, by the processor 61, perhaps buffered within the processor 61, and then executed.

When the application 66 is implemented in software it should be noted that the application 66 can be stored on virtually any (e.g. non-transitory) computer readable medium for use by or in connection with any computer related system or method. In the context of this document, a computer readable medium may be an electronic, magnetic, optical, or other physical device or means that can contain or store a computer program for use by or in connection with a computer related system or method.

The application 66 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Figure 7:
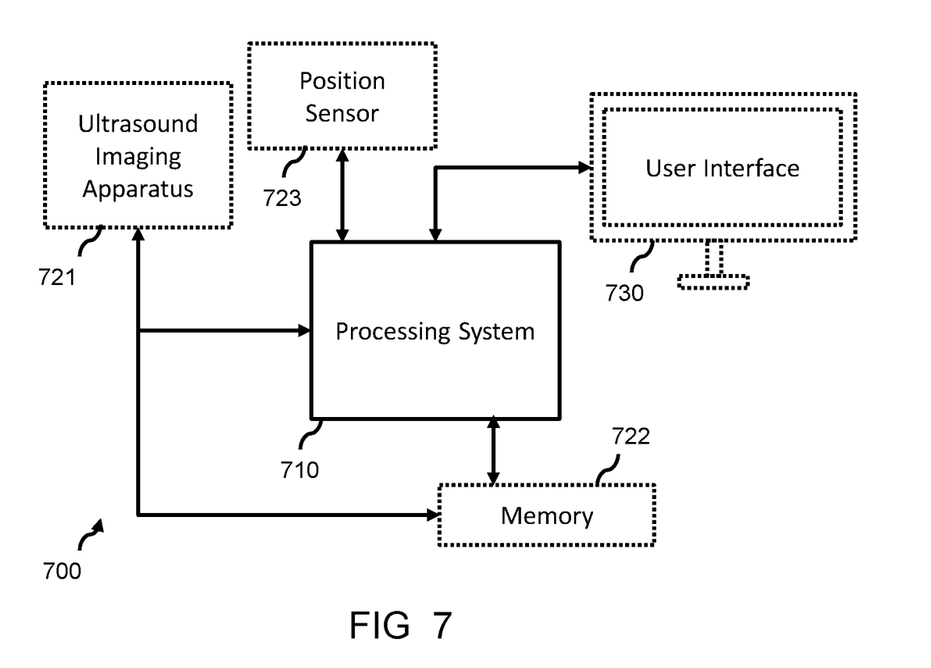
FIG. 7 illustrates an ultrasound system according to an embodiment.

FIG. 7 illustrates an ultrasound system 700 according to an embodiment. The ultrasound system 700 comprises a processing system 710, by itself an embodiment of the invention. The ultrasound system 700 can be seen as a generalized version of the ultrasound system 100 described with reference to FIG. 1.

The processing system 710 is configured to perform any herein described method. The processing system provides an example of the processing system 16 described with reference to FIG. 1 and the processing system 60 described with reference to FIG. 6.

Thus, the processing system is configured to obtain the sequence of ultrasound images, each ultrasound image containing a representation of a portion of a fetus, including the heart of the fetus; identify, in the sequence of images, a region of interest that contains a representation of the heart of the fetus in each ultrasound image; position a plurality of M-mode lines with respect to the sequence of ultrasound images, based on the identified region of interest; for each of the plurality of M-mode lines: generate M-mode data for the M-mode line; and determine a quality measure of the M-mode line by processing the generated M-mode data, and rank the plurality of M-mode lines based on the determined quality measure of each M-mode line.

The processing system may be embodied as the processing system 600 described with reference to FIG. 6.

The sequence of ultrasound images may be obtained from the ultrasound imaging apparatus 721 and/or a memory 722. The rank of each of the plurality of M-mode lines may be displayed at a user interface of the ultrasound system 100, e.g. through appropriate control of the user interface by the processing system 710.

In some examples, motion data is obtained by the processing system (e.g. from an optional position sensor of the ultrasound system). The motion data may be used to compensate for motion artefacts in M-mode data generated by the processing system and/or to provide guidance (e.g. at the user interface) for reducing motion artefacts in ultrasound images.

The skilled person would be readily capable of developing a processing system for carrying out any herein described method. Thus, each step of the flow chart may represent a different action performed by a processing system, and may be performed by a respective module of the processing system.

Embodiments may therefore make use of a processing system. The processing system can be implemented in numerous ways, with software and/or hardware, to perform the various functions required. A processor is one example of a processing system which employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Examples of processing system components that may be employed in various embodiments of the present disclosure include, but are not limited to, conventional microprocessors, application specific integrated circuits (ASICs), and field-programmable gate arrays (FPGAs).

In various implementations, a processor or processing system may be associated with one or more storage media such as volatile and non-volatile computer memory such as RAM, PROM, EPROM, and EEPROM. The storage media may be encoded with one or more programs that, when executed on one or more processors and/or processing systems, perform the required functions. Various storage media may be fixed within a processor or processing system or may be transportable, such that the one or more programs stored thereon can be loaded into a processor or processing system.

It will be understood that disclosed methods are preferably computer-implemented methods. As such, there is also proposed the concept of a computer program comprising code means for implementing any described method when said program is run on a processing system, such as a computer. Thus, different portions, lines or blocks of code of a computer program according to an embodiment may be executed by a processing system or computer to perform any herein described method. In some alternative implementations, the functions noted in the block diagram(s) or flow chart(s) may occur out of the order noted in the figures. For example, two blocks shown in succession may, in fact, be executed substantially concurrently, or the blocks may sometimes be executed in the reverse order, depending upon the functionality involved.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable (non-transitory) medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A processing system configured to generate M-mode data by processing a sequence of ultrasound images, the processing system being configured to:

obtain the sequence of ultrasound images, each ultrasound image containing a representation of a portion of a fetus, including at least the heart of the fetus;

identify, in the sequence of images, a region of interest that contains a representation of the heart of the fetus in each ultrasound image, wherein the step of identifying the region of interest comprises automatically detecting a first region of interest that contains a representation of the fetus in each ultrasound image, and automatically identifying, inside the first region of interest, a second region of interest that contains the representation of the heart of the fetus;

position a plurality of M-mode lines with respect to the sequence of ultrasound images, based on the identified region of interest;

for each of the plurality of M-mode lines:

generate M-mode data for the M-mode line;

determine a quality measure of the M-mode line by processing the generated M-mode data, rank the plurality of M-mode lines based on the determined quality measure of each M-mode line, and control a user interface to display a visual representation of rankings of the plurality of M-mode lines.

2. The processing system of claim 1, wherein the step of identifying the first region of interest comprises applying a first machine learning method to the ultrasound image, and the step of identifying the second region of interest comprises applying a second machine learning method to the first region of interest.

3. The processing system of claim 1, wherein the step of positioning the plurality of M-mode lines comprises positioning each M-mode line to pass through the region of interest.

4. The processing system of claim 1, wherein at least two of the M-mode lines are positioned, with respect to the sequence of ultrasound images, at different orientations with respect to the region of interest of the ultrasound image.

5. The processing system of claim 1, wherein each M-mode line is positioned, with respect to the sequence of ultrasound images, to pass through a different part of region of interest.

6. The processing system of claim 1, wherein each M-mode line is an anatomical M-mode line.

7. The processing system of claim 6, wherein a start and/or end position of each anatomical M-mode line is based upon the position of the region of interest.

8. The processing system of claim 1, wherein the processing system is further configured to:
receive a user input comprising an indicator that identifies one of the M-mode lines;
and control the user interface to display a visual representation of the M-mode data of the user-identified M-mode line and/or one or more characteristics of the heart of the fetus derived from the M-mode data of the user-identified M-mode line.

9. The processing system of claim 8, wherein the one or more characteristics of the heart of the fetus comprises a predicted fetal heart rate.

10. The processing system of claim 1, wherein the processing system is further configured to control a user interface to display a visual representation of the M-mode data of the highest ranked M-mode line and/or one or more characteristics of the heart of the fetus derived from the M-mode data of the highest ranked M-mode line.

11. The processing system of claim 1 further comprises a step of determining any movement of the region of interest in the sequence of ultrasound images by means of determining the position of the first region of interest and/or the position of the second region of interest in the sequence of ultrasound images.

12. The processing system of claim 11, wherein the processing system is further configured to control each M-mode line to track any movement of the region of interest in the sequence of ultrasound images.

13. A computer-implemented method of generating M-mode data from a sequence of ultrasound images, the computer-implemented method comprising:
obtaining the sequence of ultrasound images, each ultrasound image containing a representation of a portion of a fetus, including at least the heart of the fetus;
identifying, in the sequence of images, a region of interest that contains a representation of the heart of the fetus in each ultrasound image, wherein the step of identifying the region of interest comprises automatically detecting a first region of interest that contains a representation of the fetus in each ultrasound image, and automatically identifying, inside the first region of interest, a second region of interest that contains the representation of the heart of the fetus;
positioning a plurality of M-mode lines on the sequence of ultrasound images, based on the identified region of interest;
for each of the plurality of M-mode lines:
generating M-mode data by processing the portion of each ultrasound image upon which the M-mode line was placed;
determining a quality measure of the M-mode line by processing the generated M-mode data, ranking the plurality of M-mode lines based on the determined quality measure of each M-mode line, and displaying a visual representation of rankings of the plurality of M-mode lines on a user interface.

14. A non-transitory computer readable media comprising computer program code which, when executed on a computing device having a processing system, cause the processing system to perform all of the steps of the method according to claim 13.

* * * * *